US012649400B2

(12) United States Patent
Lee et al.

(10) Patent No.: US 12,649,400 B2
(45) Date of Patent: Jun. 9, 2026

(54) SYSTEMS AND METHODS FOR MASSAGING LEGS OF A VEHICLE OCCUPANT

(71) Applicant: GM GLOBAL TECHNOLOGY OPERATIONS LLC, Detroit, MI (US)

(72) Inventors: Minsu Lee, Gyeonggi-do (KR); Jongsuk An, Incheon (KR); Sungil Yun, Incheon (KR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 294 days.

(21) Appl. No.: 18/538,349

(22) Filed: Dec. 13, 2023

(65) Prior Publication Data

US 2025/0196746 A1 Jun. 19, 2025

(51) Int. Cl.
B60N 2/90 (2018.01)

(52) U.S. Cl.
CPC ................................... B60N 2/976 (2018.02)

(58) Field of Classification Search
CPC ........ B60N 2/0284; B60N 2/62; B60N 2/976; B60N 2/914; B60N 2/995
See application file for complete search history.

(56) References Cited

U.S. PATENT DOCUMENTS

| | | | | | |
|---|---|---|---|---|---|
| 4,655,505 | A | * | 4/1987 | Kashiwamura | ........ B60N 2/976 297/284.6 |
| 6,055,473 | A | * | 4/2000 | Zwolinski | ............ B60N 2/0022 701/45 |
| 6,592,533 | B1 | * | 7/2003 | Yonekawa | ................ A47C 4/54 601/49 |
| 8,979,191 | B2 | * | 3/2015 | Friderich | ............. B60N 2/5685 297/DIG. 3 |
| 10,258,535 | B2 | * | 4/2019 | Lem | ........................ B60N 2/976 |
| 10,449,878 | B2 | * | 10/2019 | Sala | ...................... B60N 2/0224 |
| 10,471,851 | B2 | * | 11/2019 | Loppolo | ............ B60N 2/02253 |
| 11,001,170 | B2 | * | 5/2021 | Tait | ........................ B60N 2/995 |
| 11,059,407 | B2 | * | 7/2021 | Tait | ...................... B60N 2/0284 |
| 11,325,509 | B2 | * | 5/2022 | Panchani | ............. B60N 2/0284 |
| 11,634,055 | B2 | * | 4/2023 | Migneco | ................ B60N 2/003 701/36 |
| 11,679,706 | B2 | * | 6/2023 | Migneco | .............. B60N 2/0273 297/354.12 |
| 11,938,845 | B2 | * | 3/2024 | Kimbara | ................. B60N 2/58 |
| 11,981,232 | B2 | * | 5/2024 | Riva | .................... B60N 2/5816 |

(Continued)

FOREIGN PATENT DOCUMENTS

| | | |
|---|---|---|
| CN | 116407436 A | 7/2023 |
| DE | 102020121632 A1 | 4/2021 |

(Continued)

*Primary Examiner* — Shin H Kim
(74) *Attorney, Agent, or Firm* — Ingrassia Fisher & Lorenz, LLP | IF&L

(57) ABSTRACT

Methods and systems are provided for massaging legs of an occupant of a vehicle. The systems include a leg support member configured to be disposed adjacent to a seat cushion of a seat of a vehicle and support a portion of legs of an individual while the individual is sitting on the seat cushion, a massage device configured to perform a massage of the portion of the legs, and a control module configured to receive a command to perform the massage and to activate the massage device in response to receiving the command.

15 Claims, 6 Drawing Sheets

(56)                References Cited

U.S. PATENT DOCUMENTS

| | | | |
|---|---|---|---|
| 12,208,731 B2 * | 1/2025 | Hong | B60Q 5/008 |
| 12,214,699 B2 * | 2/2025 | Takiya | B60N 2/62 |
| 12,521,301 B2 * | 1/2026 | Kong | A61H 15/0078 |
| 2003/0038517 A1 * | 2/2003 | Moran | B60N 2/914 |
| | | | 297/284.6 |
| 2004/0034314 A1 * | 2/2004 | Kobayashi | B60N 2/62 |
| | | | 601/5 |
| 2012/0032478 A1 * | 2/2012 | Friderich | B60N 2/5685 |
| | | | 297/180.1 |
| 2015/0008710 A1 * | 1/2015 | Young | B60N 2/0276 |
| | | | 297/217.3 |
| 2015/0375865 A1 * | 12/2015 | Fischer | B60N 2/22 |
| | | | 701/49 |
| 2016/0347329 A1 * | 12/2016 | Zelman | B60W 50/16 |
| 2016/0354027 A1 * | 12/2016 | Benson | B60N 2/976 |
| 2018/0325264 A1 * | 11/2018 | Gallagher | B60N 2/5685 |
| 2019/0077289 A1 * | 3/2019 | Mergl | B60N 2/976 |
| 2019/0381271 A1 * | 12/2019 | Jo | A61H 15/00 |
| 2020/0238875 A1 * | 7/2020 | Godlewski | B60N 2/99 |
| 2021/0078450 A1 * | 3/2021 | Tait | B60N 2/0292 |
| 2021/0085558 A1 * | 3/2021 | Shin | A61H 9/0078 |
| 2023/0001129 A1 * | 1/2023 | Ito | A47C 7/748 |
| 2023/0129527 A1 * | 4/2023 | Kimbara | B60N 2/58 |
| | | | 297/284.1 |
| 2023/0145350 A1 * | 5/2023 | Ulmer | B60N 2/7005 |
| | | | 297/217.3 |
| 2023/0355462 A1 * | 11/2023 | Ghanime | B60N 2/976 |
| 2024/0300392 A1 * | 9/2024 | Feroni | B60N 2/0284 |
| 2025/0033534 A1 * | 1/2025 | Bashir | B60N 2/7094 |
| 2025/0143955 A1 * | 5/2025 | Kim | A61H 15/00 |
| 2025/0196746 A1 * | 6/2025 | Lee | B60N 2/976 |
| 2025/0249813 A1 * | 8/2025 | Patton | B60N 2/995 |
| 2025/0326344 A1 * | 10/2025 | Akbari Asl | B60N 3/06 |

FOREIGN PATENT DOCUMENTS

| | | |
|---|---|---|
| DE | 102022110903 A1 | 11/2022 |
| EP | 1285809 A1 | 2/2003 |

* cited by examiner

SYSTEMS AND METHODS FOR MASSAGING LEGS OF A VEHICLE OCCUPANT

INTRODUCTION

The technical field generally relates to vehicle seats, and more particularly relates to leg support members for vehicle seats that include leg massage devices.

Contemporary automobiles offer a range of amenities designed to enhance the comfort of their occupants. Examples of these features include adjustable seats that can be customized to accommodate specific occupants, including adjustments for seat height, recline angle, lumbar support, and headrest height. Other comfort features may involve seats with temperature control and extendable seat cushions. Such enhancements contribute to an elevated user experience and increased customer satisfaction.

Accordingly, it is desirable to provide systems and methods capable of promoting occupant comfort while in a vehicle. Furthermore, other desirable features and characteristics of the present disclosure will become apparent from the subsequent detailed description and the appended claims, taken in conjunction with the accompanying drawings and the foregoing introduction.

SUMMARY

A method is provided for massaging legs of an occupant of a vehicle. In one example, the method includes disposing a leg support member within a vehicle adjacent to a seat cushion of a seat of the vehicle, supporting a portion of legs of an individual with the leg support member while the individual is sitting on the seat cushion, receiving, by a control module, a command to perform a massage on the portion of legs of the individual, and activating, with the control module, one or more massage devices of the leg support member to perform the massage.

In various examples, the method includes coupling the one or more massage devices to the control module with a wiring harness.

In various examples, the method includes moving the leg support member relative to the seat cushion of the seat, wherein the leg support member is coupled to the seat.

In various examples, the portion of the legs massaged in the method includes at least one thigh of the legs. In various examples, the portion of the legs includes at least one calf of the legs.

In various examples, the method includes generating the command in response to the individual interacting with a human interface device of the vehicle.

A system is provided for massaging legs of an occupant of a vehicle. In one example, the system includes a leg support member configured to be disposed adjacent to a seat cushion of a seat of a vehicle and support a portion of legs of an individual while the individual is sitting on the seat cushion, a massage device configured to perform a massage of the portion of the legs, and a control module configured to receive a command to perform the massage and to activate the massage device in response to receiving the command.

In various examples, the massage device of the system is coupled to the control module with a wiring harness.

In various examples, the leg support member of the system is coupled to the seat and configured to move relative to the seat cushion of the seat.

In various examples, the portion of the legs massaged by the system includes at least one thigh of the legs. In various examples, the portion of the legs includes at least one calf of the legs.

In various examples, the system includes a human interface device configured to generate the command in response to the individual interacting with the human interface device.

In various examples, the massage device of the system includes an inflatable body configured to controllably inflate and deflate.

A vehicle is provided that, in one example, includes a seat having a seat cushion configured to support an individual sitting on the seat cushion, a leg support member configured to be disposed adjacent to the seat cushion and support a portion of legs of the individual while the individual is sitting on the seat cushion, a massage device configured to perform a massage of the portion of the legs, and a control module configured to receive a command to perform the massage and to activate the massage device in response to receiving the command.

In various examples, the massage device of the vehicle is coupled to the control module with a wiring harness.

In various examples, the leg support member of the vehicle is coupled to the seat and configured to move relative to the seat cushion of the seat.

In various examples, the portion of the legs massaged in the vehicle includes at least one thigh of the legs. In various examples, the portion of the legs includes at least one calf of the legs.

In various examples, the vehicle includes a human interface device configured to generate the command in response to the individual interacting with the human interface device.

In various examples, the massage device of the vehicle includes an inflatable body configured to controllably inflate and deflate.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Examples of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that examples of the present disclosure may be practiced in conjunction with any number of systems, and that the systems described herein is merely examples of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an example of the present disclosure.

Figure 1:
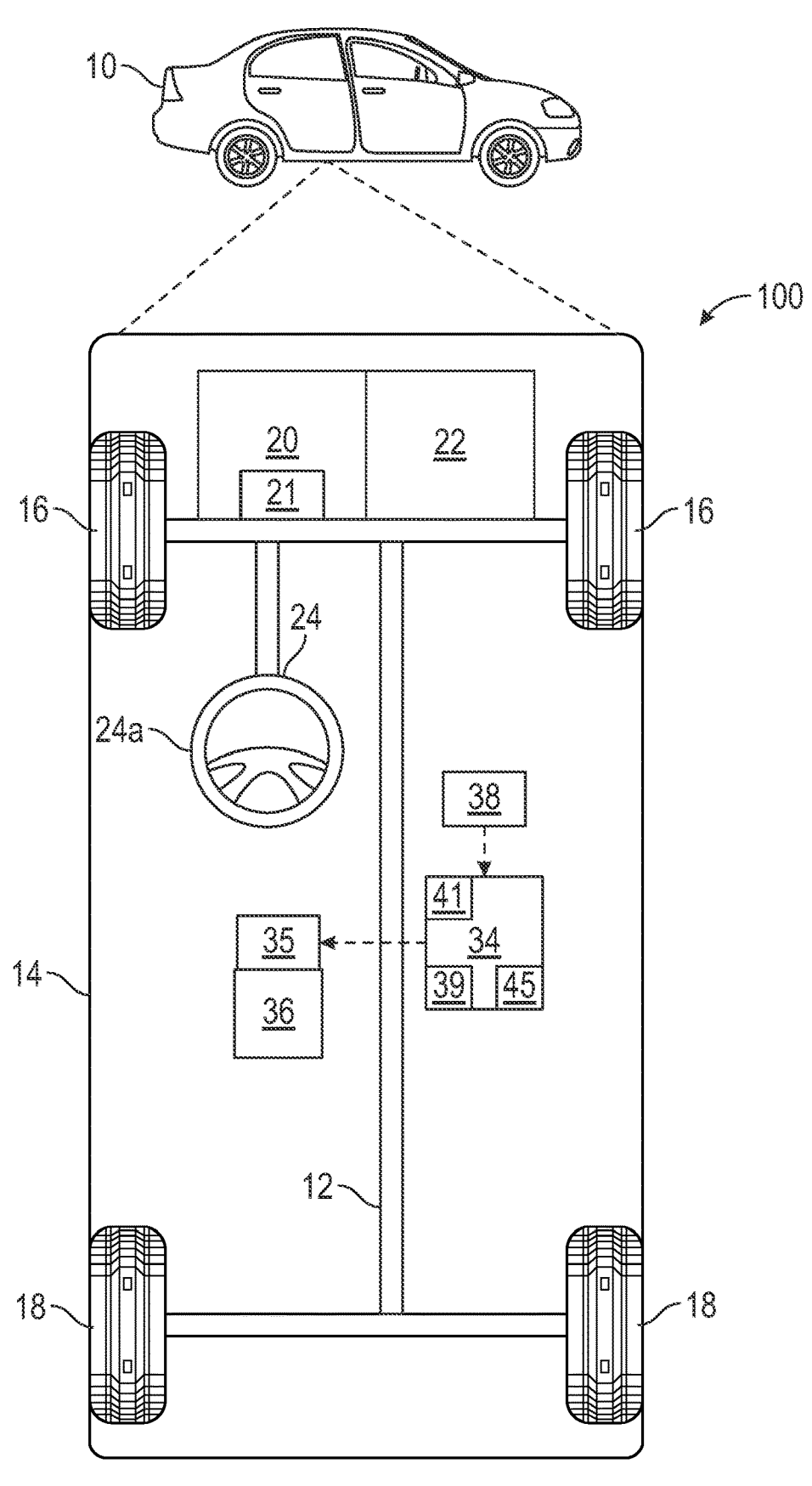
FIG. 1 is functional block diagram of a vehicle that includes a leg massage system in accordance with an example.

FIG. 1 illustrates a vehicle 10, according to an example. In certain examples, the vehicle 10 comprises an automobile. The vehicle 10 includes a leg massage system 100 having one or more massage devices configured for massaging legs of an occupant of the vehicle.

In various examples, the vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles or mobile platforms in certain examples.

As depicted in FIG. 1, the exemplary vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

The vehicle 10 further includes a propulsion system 20, a transmission system 22, a steering system 24, at least one control module 34, a leg support member 35, a seat 36, and a human interface device 38. The propulsion system 20 includes an engine and/or motor 21 such as an internal combustion engine (e.g., a gasoline or diesel fueled combustion engine), an electric motor (e.g., a 3-phase AC motor), or a hybrid system that includes more than one type of engine and/or motor. The transmission system 22 is configured to transmit power from the propulsion system 20 to the wheels 16-18 according to selectable speed ratios. According to various examples, the transmission system 22 may include a step-ratio automatic transmission, a continuously-variable transmission, or other appropriate transmission. The steering system 24 influences a position of the wheels 16-18. While depicted as including a steering wheel 24a for illustrative purposes, in some examples contemplated within the scope of the present disclosure, the steering system 24 may not include the steering wheel 24a.

The control module 34 may include a processor 39, a communication bus 41, and a computer readable storage device or media 45. The processor 39 performs the computation and control functions of the control module 34. The processor 39 may be any custom made or commercially available processor, a central processing unit (CPU), a graphics processing unit (GPU), an auxiliary processor among several processors associated with the control module 34, a semiconductor-based microprocessor (in the form of a microchip or chip set), a macroprocessor, any combination thereof, or generally any device for executing instructions. The computer readable storage device or media 45 may include volatile and nonvolatile storage in read-only memory (ROM), random-access memory (RAM), and keep-alive memory (KAM), for example. KAM is a persistent or non-volatile memory that may be used to store various operating variables while the processor 39 is powered down. The computer-readable storage device or media 45 may be implemented using any of a number of known memory devices such as PROMs (programmable read-only memory), EPROMs (erasable PROM), EEPROMs (electrically erasable PROM), flash memory, or any other electric, magnetic, optical, or combination memory devices capable of storing data, some of which represent executable instructions, used by the control module 34 in controlling the vehicle 10. The bus 41 serves to transmit programs, data, status and other information or signals between the various components of the vehicle 10. The bus 41 may be any suitable physical or logical means of connecting computer systems and components. This includes, but is not limited to, direct hard-wired connections, fiber optics, infrared, and wireless bus technologies.

The instructions may include one or more separate programs, each of which comprises an ordered listing of executable instructions for implementing logical functions. The instructions, when executed by the processor 39, receive and process signals from the sensor system 28, perform logic, calculations, methods and/or algorithms, and generate data based on the logic, calculations, methods, and/or algorithms. Although only one control module 34 is shown in FIG. 1, examples of the vehicle 10 may include any number of control modules 34 that communicate over any suitable communication medium or a combination of communication mediums and that cooperate to process the sensor signals, perform logic, calculations, methods, and/or algorithms, and generate data.

As may be appreciated, that the control module 34 may otherwise differ from the example depicted in FIG. 1. For example, the control module 34 may be coupled to or may otherwise utilize one or more remote computer systems and/or other control systems, for example as part of one or more of the above-identified vehicle devices and systems. It will be appreciated that while this example is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 39) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain examples. It will similarly be appreciated that the computer system of the control module 34 may also otherwise differ from the example depicted in FIG. 1, for example in that the computer system of the control module 34 may be coupled to or may otherwise utilize one or more remote computer systems and/or other control systems.

The seat 36 may include a frame 40 secured to a floor of the vehicle 10, a seat cushion 42 coupled to the frame 40, a seatback 43 secured at a lower end thereof to the seat cushion 42 and/or the frame 40, and a headrest (not shown) secured to an upper end of the seatback 43. The seat cushion 42 may be configured to support an occupant seated thereon, the seatback 43 may be configured to support the occupant's back while seated on the seat cushion 42, and the headrest may be configured to support the occupant's head. The seat 36 may include various components that provide for adjustment of the seat 36, such as systems for adjusting a height of the seat 36, a recline angle of the seatback 43, lumbar support, and a height of the headrest relative to an upper end of the seatback 43.

The leg support member 35 is configured to support a portion of the occupant's legs while the occupant is sitting on the seat 36. In some examples, the leg support member 35 may be coupled to the seat 36, such as to the frame 40 or the seat cushion 42. The leg support member 35 may have various structures and capabilities. In some examples, the leg support member 35 may be configured to move, extend/retract, and/or pivot relative to the seat 36, for example, relative to the seat cushion 42.

Figures 2, 3:
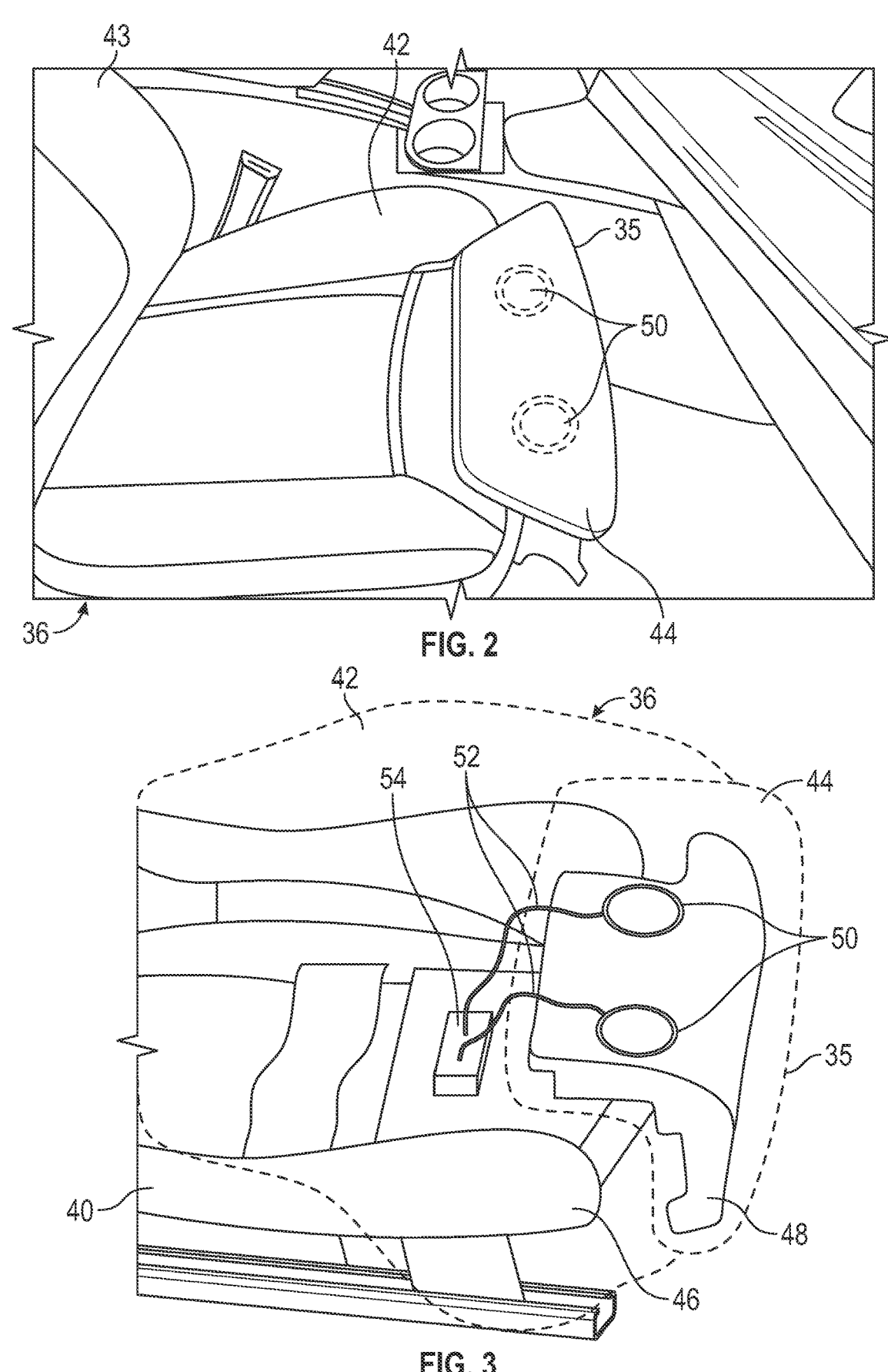
FIG. 2 is a perspective view of a first leg support member disposed adjacent to a seat cushion of a seat of the vehicle of FIG. 1 in accordance with an example.
FIG. 3 is a partially transparent, perspective view illustrating components of the first leg support member of FIG. 2 in accordance with an example.
Figure 4:
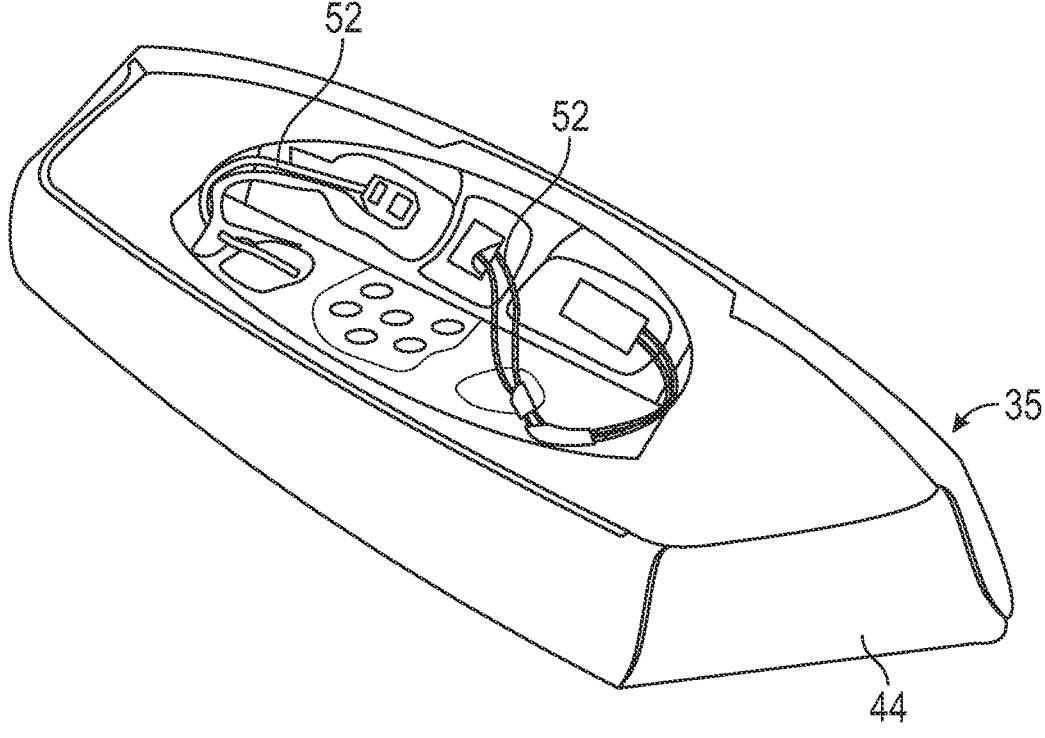
FIG. 4 is a perspective view of a bottom of the first leg support member of FIG. 2 in accordance with an example.

FIGS. 2-4 present various aspects of the leg support member 35 in accordance with one nonlimiting example. The leg support member 35 is coupled to or a component of the seat 36. The seat cushion 42 and the leg support member 35 in combination provide a support area on which an occupant of the seat 36 may sit. The leg support member 35 is configured to slide in a first direction toward the front of the vehicle 10 to increase a size of the support area, and configured to slide in a second direction toward the rear of the vehicle 10 to reduce the size of the support area. In some examples, when fully retracted toward the rear of the vehicle 10, the leg support member 35 may be substantially flush with adjacent portions of the seat cushion 42.

More specifically, the frame 40 includes a primary structure 46 and a secondary structure 48. The primary structure 46 is configured to support the seat cushion 42, among other components of the seat 36. The secondary structure 48 is configured to support a leg cushion 44 and slide relative to the primary structure 46 to reposition the leg cushion 44 relative to the seat cushion 42. Movement of the secondary structure 48 relative to the primary structure 46 may be initiated, performed, and/or controlled manually by an occupant of the seat 36, with a motor in response to the occupant interacting with a control mechanism, or with the motor in response to a command by the control module 34 of the vehicle 10.

The leg support member 35 includes one or more massage devices 50 each configured to perform a massage on a portion of the legs of the occupant of the seat 36. In some examples, the massage devices 50 are configured to perform a massage on portions of the occupant's thighs or lower legs, such as the calves. The massage devices 50 may have various structures and may be configured to perform massages in various manners. In some examples, the massage devices 50 may be configured to sequentially inflate and deflate inflatable bodies (e.g., airbags, chambers, or bladders) embedded in the leg cushion 44 and configured to controllably inflate and deflate to provide a compression massage. That is, the inflation and deflation of the inflatable bodies create a kneading effect, which may relieve tension and improve blood circulation. In some examples, the massage devices 50 may be configured to produce rhythmic vibrations, for example, with one or more vibration motors, to stimulate muscles and provide a soothing effect. In some examples, the massage devices 50 may be configured to move one or more rollers within the leg cushion 44 to apply a massaging force against the occupant's legs. In some examples, the leg support member 35 may further include one or more heating elements to provide heat therapy in addition to the massage to promote relaxation and increase blood flow.

In various examples, the leg support member 35 may include one or more controls or mechanisms (not shown) for manually initiating the massage and/or adjusting parameters of the massage. In various examples, the leg support member 35 may include be configured to physically couple with one or more controls or mechanisms (not shown) for manually initiating the massage and/or adjusting parameters of the massage. In various examples, the leg support member 35 may include one or more systems (not shown) for automatically initiating the massage and/or adjusting parameters of the massage. In various examples, the one or more controls or mechanisms and/or systems may be a component of the vehicle 10 (e.g., ECU) or a remote device (e.g., remote control device or smart phone). In various examples, the adjustable parameters of the massage may include massage settings, such as intensity, speed, direction, and mode.

In various examples, the leg support member 35 may include one or more wiring harnesses 52 configured to couple the massage devices 50 to corresponding ports of the vehicle 10. In some examples, the wiring harnesses 52, while coupled to the vehicle 10, are configured to provide power from the vehicle 10 to the massage devices 50, to facilitate communication between the massage device 50 and the vehicle 10 (e.g., an ECU), or both.

Figure 5:
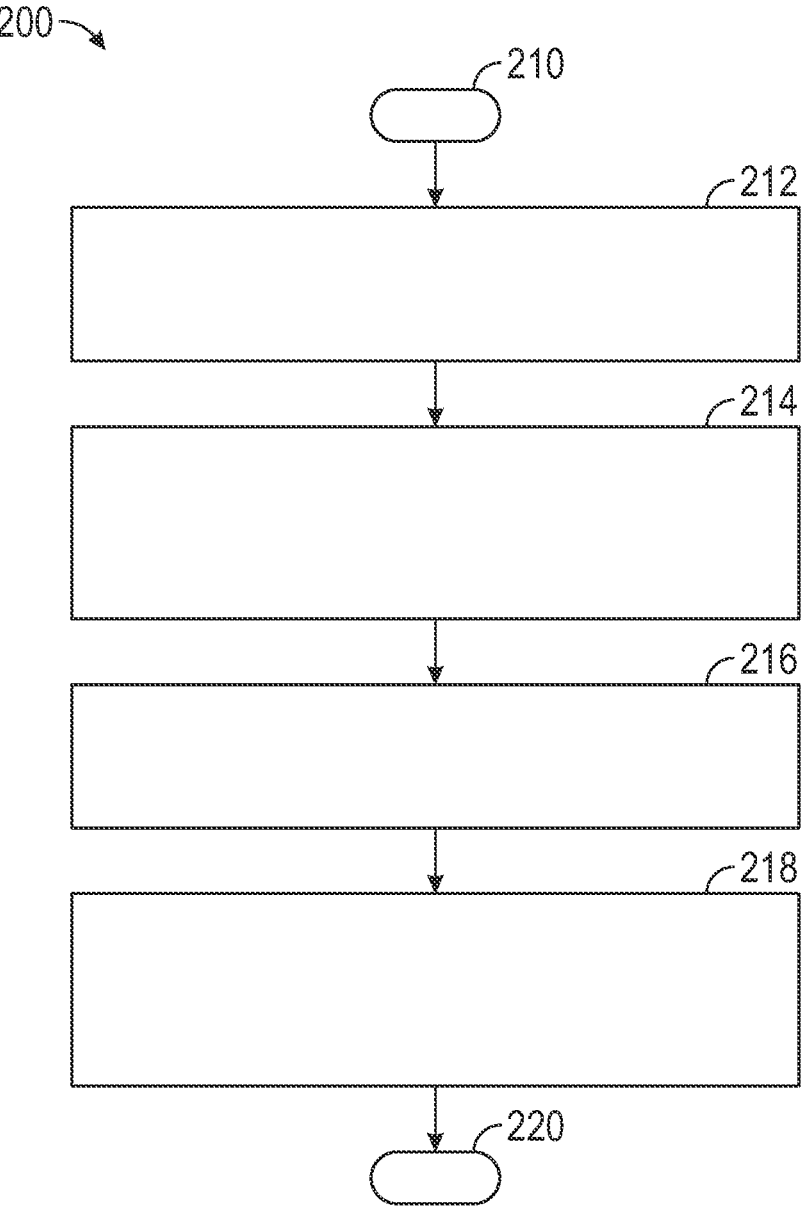
FIG. 5 is a flowchart illustrating a method for performing a massage on legs of an occupant of a vehicle in accordance with an example.

With reference now to FIG. 5 and with continued reference to FIGS. 1-4, a flowchart provides a method 200 for performing a massage to the legs of the occupant while seated in the seat 36 as performed by the system 100, in accordance with various examples. As may be appreciated in light of the disclosure, the order of operation within the method 200 is not limited to the sequential execution as illustrated in FIG. 5, but may be performed in one or more varying orders as applicable and in accordance with the present disclosure.

In one example, the method 200 may start at 210. At 212, the method 200 may include disposing a leg support member within a vehicle adjacent to a seat cushion of a seat of the vehicle. At 214, the method 200 may include supporting a portion of the legs of the occupant while the individual is sitting on the seat 36 with the leg support member 35. At 216, the method 200 may include receiving a command to perform a massage on the portion of the legs of the occupant. In some examples, the command may be generated in response to the occupant interacting with the human interface device 38 of the vehicle 10. At 218, the method 200 may include, in response to receiving the command, activating one or more massage devices 50 of the leg support member 35 to perform the massage. In some example, the command may be received at 216 by the control module 34, and the massage device(s) 50 may be activated by the control module 34 at 218. The method 200 may end at 220.

Figure 6:
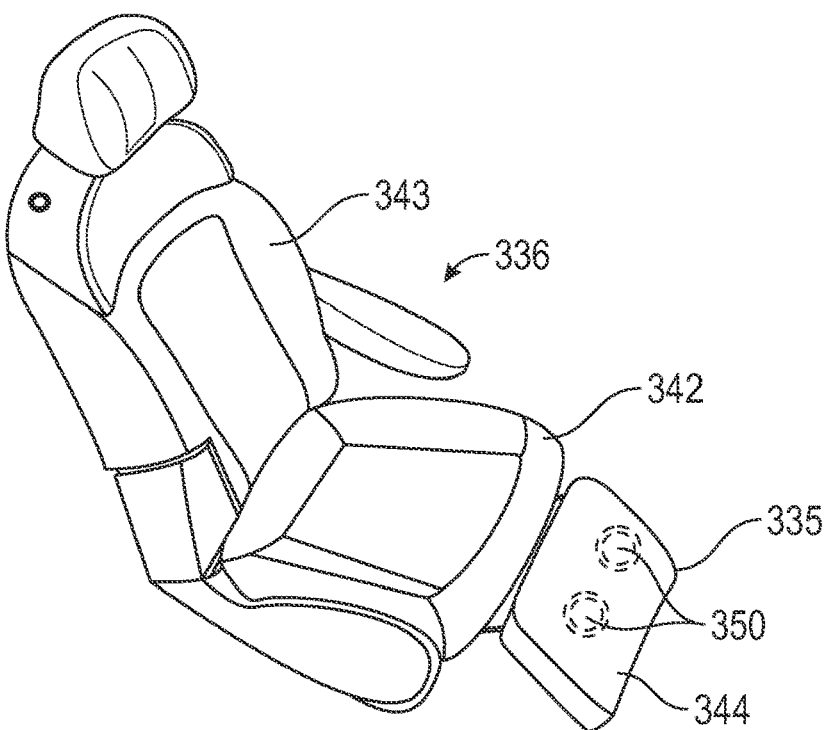
FIG. 6 is a perspective view of a second leg support member disposed adjacent to a seat cushion of a seat of the vehicle of FIG. 1 in accordance with an example.
Figure 7:
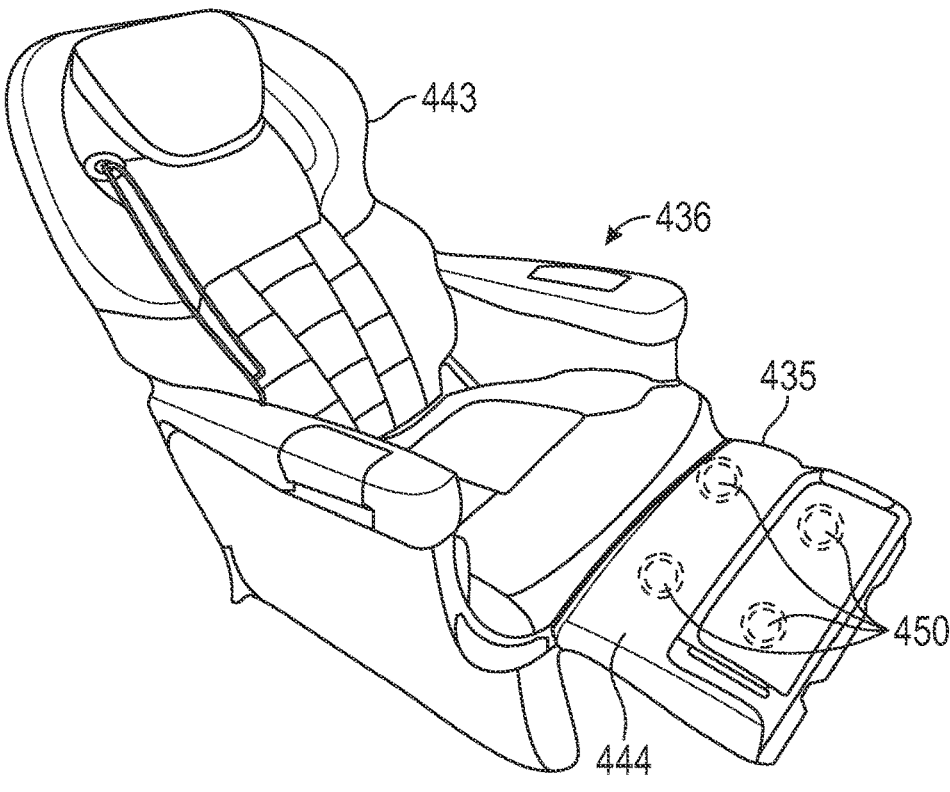
FIG. 7 is a perspective view of a third leg support member disposed adjacent to a seat cushion of a seat of the vehicle of FIG. 1 in accordance with an example.
Figure 8:
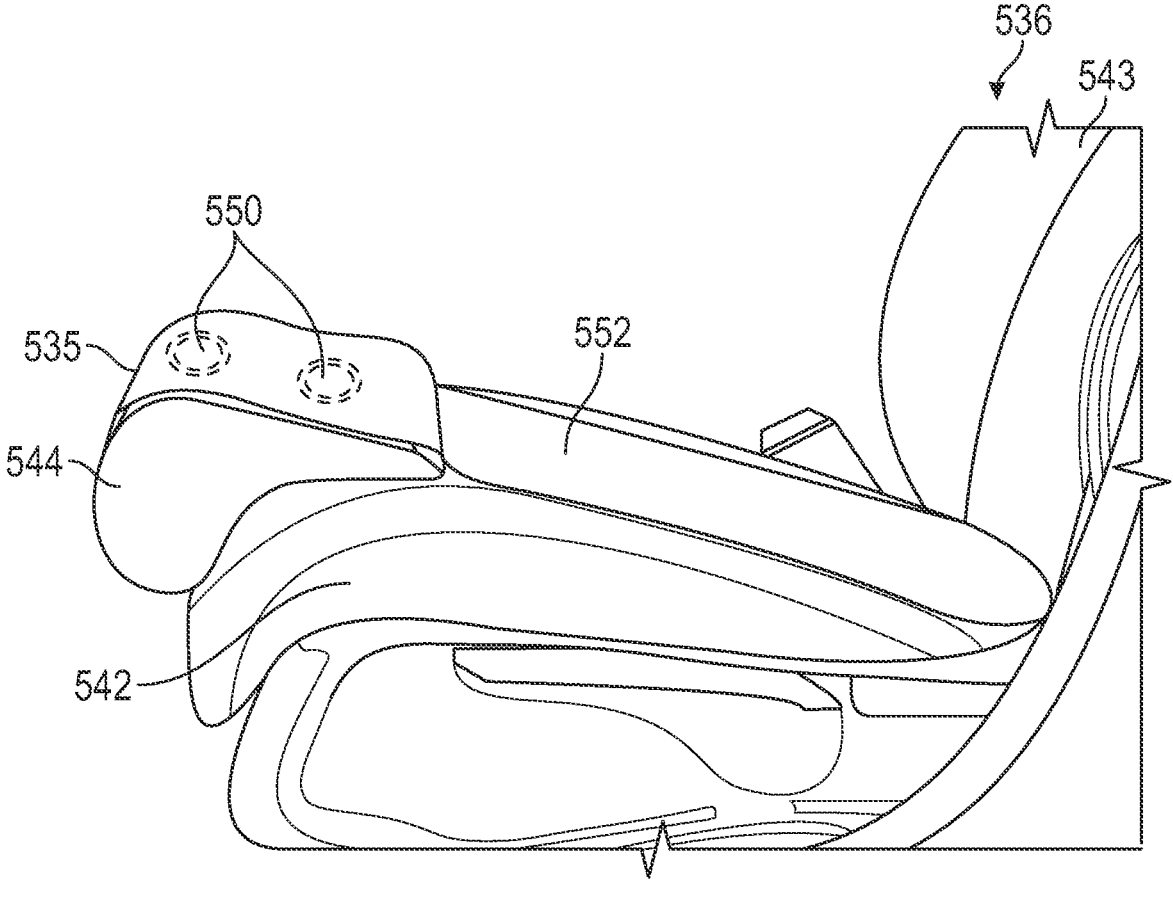
FIG. 8 is a perspective view of a fourth leg support member disposed adjacent to a seat cushion of a seat of the vehicle of FIG. 1 in accordance with an example.

FIGS. 6-8 illustrate various additional examples of leg support members that may be used in combination with vehicle seats, such as the seat 36. In these figures, consistent reference numbers are used to identify the same or related elements, but with a numerical prefix (1, 2, or 3, etc.) added to distinguish the particular example from the other examples. In view of similarities between the examples, the following discussion of FIGS. 6-8 will focus primarily on aspects of the further examples that differ from the first example in some notable or significant manner. Other aspects of the further examples not discussed in any detail can be, in terms of structure, function, materials, etc., essentially as was described for the first example. It should be noted that these examples are merely for illustrative purposes and the system 100 of FIG. 1 may have other configurations, including various combinations of the components represented in FIGS. 2-4 and 6-8.

FIG. 6 presents a seat 336 having a seat cushion 342 and a seatback 343. In this example, a leg support member 335 is secured to the seat 336 (e.g., to a frame thereof) and having a leg cushion 344 disposed in a fixed position relative to the seat cushion 342 (e.g., downward sloping angle). In this position, the leg support member 335 may be configured to support portions of the lower legs of an occupant sitting on the seat 336, such as the occupant's calves. The leg support member 335 includes massage devices 350 configured to perform a massage to the portions of the occupant's legs in contact with the leg cushion 344. The massage devices 350 may be substantially the same as the massage devices 50 of FIGS. 1-4. For example, the massage devices 350 may be coupled to a control module (e.g., the control module 34) via one or more wiring harnesses (not shown).

FIG. 7 presents a seat 436 having a seat cushion 442 and a seatback 443. In this example, a leg support member 435 is secured to the seat 436 (e.g., to a frame thereof) and having a leg cushion 444 configured to pivot relative to an end of the seat cushion 442. With this structure, the leg support member 435 may be configured to support portions of the lower legs of an occupant sitting on the seat 436 in one or more positions (e.g., between lowermost and uppermost pivoting positions). The leg support member 435 includes massage devices 450 configured to perform a massage to the portions of the occupant's legs in contact with the leg cushion 444. The massage devices 450 may be substantially the same as the massage devices 50 of FIGS. 1-4. For example, the massage devices 450 may be coupled to a control module (e.g., the control module 34) via one or more wiring harnesses (not shown).

FIG. 8 presents an independent leg support member 535 configured to be releasably coupled to a seat 536. In this example, the leg support member 535 includes a leg cushion 544 configured to be disposed on a forward end of a seat cushion 542 of the seat 536 and secured in such position. In some examples, the leg cushion 544 may be shaped to match or substantially match a contour of the seat cushion 542. In this position on the forward end of the seat cushion 542, the leg support member 535 may be configured to support portions of thighs and or lower legs of an occupant sitting on the seat 536.

The leg support member 535 may be releasably coupled to the seat 536 in various manners. In the example of FIG. 8, a seat cover 552 is secured to a first edge of the leg cushion 544 and a strap or other fastening device (not shown) is secured to a second edge of the leg cushion 544. The seat cover 552 is configured to be disposed on the seat cushion 542. One or more connectors (not shown) are secured to a distal end of the seat cover 552 and configured to releasably secure to the seat 536 between the seat cushion 542 and the seatback 543 (e.g., secured to the frame therebetween). The strap is configured to releasably secure to the seat 536.

The leg support member 535 includes massage devices 550 configured to perform a massage to the portions of the occupant's legs in contact with the leg cushion 544. The massage devices 550 may be substantially the same as the massage devices 50 of FIGS. 1-4. For example, the massage devices 550 may be coupled to a control module (e.g., the control module 34) via one or more wiring harnesses (not shown).

The leg support member 535 may provide power to the massage devices 550 in various manners. In some examples, the leg support member 535 may have one or more wiring harnesses configured to couple the massage devices 550 or another device electrically coupled thereto to a power source of the vehicle 10. For example, the leg support member 535 may be configured to receive power from a power source connection of the seat 636, a universal serial bus (USB) connection of the vehicle 10, or another electrical connection of the vehicle 10. In some examples, the leg support member 535 may include one or more batteries configured to power the massage device 550.

In some examples, the massage devices 550 may be operable via interaction with one or more mechanisms or controls of the vehicle 10 via, for example, a wiring harness or a wireless connection (e.g., Bluetooth). In some examples, the massage devices 550 may be operable via interaction with one or more mechanisms or controls local to the leg support member 535.

The systems and methods disclosed herein provide various benefits over certain existing systems and methods. For example, the systems and methods may provide an additional comfort feature for vehicle seats including performing a massage on portions of an occupants legs, such as the thighs and/or lower legs. Although some existing vehicle seats may be capable of performing massages on an occupant's back via the seatback and/or rear via the seat cushion, such seats are not capable of performing massages to portions of occupant's legs that are in contact with a leg extension member. This enhancement contributes to an elevated user experience and may promote an increase in customer satisfaction.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method, comprising:

disposing a leg support member within a vehicle adjacent to a seat cushion of a seat of the vehicle, wherein the leg support member is coupled to the seat, positioned forward of the seat cushion, and is configured to move relative to the seat cushion to extend a seating surface beyond the seat cushion;

supporting at least one of thighs and calves of legs of an individual with the leg support member while the individual is sitting on the seat cushion;

receiving, by a control module, a command to perform a massage on the at least one of thighs and calves of legs of the individual;

activating, with the control module, one or more massage devices positioned within the leg support member to perform the massage on the at least one of thighs and calves of the legs supported by the leg support member, wherein at least a first of the one or more massage devices includes an inflatable body configured to controllably inflate and deflate, wherein at least a second of the one of more massage devices includes a vibration motor configured to produce rhythmic vibrations, wherein at least a third of the one or more massage devices includes a movable roller configured to apply a massaging force; and activating, with the control module, one or more heating elements disposed in the leg support member to provide heat therapy concurrently with the massage.

2. The method of claim 1, further comprising coupling the one or more massage devices to the control module with a wiring harness, wherein the leg support member is configured to be releasably coupled to the seat, and wherein the leg support member includes a seat cover secured to an edge of the leg support member and configured to be disposed on the seat cushion.

3. The method of claim 1, further comprising generating the command in response to the individual providing user input with a human interface device of the vehicle, wherein the control module is configured to adjust one or more massage parameters selected from intensity, speed, direction, and mode in response to additional user input provided by the individual.

4. A system, comprising:

a leg support member configured to be disposed adjacent to a seat cushion of a seat of a vehicle and support at least one of thighs and calves of legs of an individual while the individual is sitting on the seat cushion, wherein the leg support member is coupled to the seat, positioned forward of the seat cushion, and is configured to move relative to the seat cushion to extend a seating surface beyond the seat cushion;

one or more massage devices positioned within the leg support member and configured to perform a massage of the at least one of thighs and calves of the legs, wherein at least a first of the one or more massage devices includes an inflatable body configured to controllably inflate and deflate, wherein at least a second of the one of more massage devices includes a vibration motor configured to produce rhythmic vibrations, wherein at least a third of the one or more massage devices includes a movable roller configured to apply a massaging force;

one or more heating elements disposed in the leg support member and configured to provide heat therapy concurrently with the massage; and a control module configured to receive a command to perform the massage and to activate the one or more massage devices to perform the massage on the at least one of thighs and calves of the legs supported by the leg support member in response to receiving the command.

5. The system of claim 4, wherein the one or more massage devices is coupled to the control module with a wiring harness, wherein the leg support member is configured to be releasably coupled to the seat, and wherein the leg support member includes a seat cover secured to an edge of the leg support member and configured to be disposed on the seat cushion.

6. The system of claim 4, further comprising a human interface device configured to generate the command in response to the individual providing user input with the human interface device, wherein the control module is configured to adjust one or more massage parameters selected from intensity, speed, direction, and mode in response to additional user input provided by the individual.

7. A vehicle, comprising:

a seat having a seat cushion configured to support an individual sitting on the seat cushion;

a leg support member configured to be disposed adjacent to the seat cushion and support at least one of thighs and calves of legs of the individual while the individual is sitting on the seat cushion, wherein the leg support member is coupled to the seat, positioned forward of the seat cushion, and is configured to move relative to the seat cushion to extend a seating surface beyond the seat cushion;

one or more massage devices positioned within the leg support member and configured to perform a massage of the at least one of thighs and calves of the legs, wherein at least a first of the one or more massage devices includes an inflatable body configured to controllably inflate and deflate, wherein at least a second of the one of more massage devices includes a vibration motor configured to produce rhythmic vibrations, wherein at least a third of the one or more massage devices includes a movable roller configured to apply a massaging force;

one or more heating elements disposed in the leg support member and configured to provide heat therapy concurrently with the massage; and a control module configured to receive a command to perform the massage and to activate the one or more massage devices to perform the massage on the at least one of thighs and calves of the legs supported by the leg support member in response to receiving the command.

8. The vehicle of claim 7, wherein the one or more massage devices are coupled to the control module with a wiring harness, wherein the leg support member is configured to be releasably coupled to the seat, and wherein the leg support member includes a seat cover secured to an edge of the leg support member and configured to be disposed on the seat cushion.

9. The vehicle of claim 7, further comprising a human interface device configured to generate the command in response to the individual providing user input with the human interface device, wherein the control module is configured to adjust one or more massage parameters selected from intensity, speed, direction, and mode in response to additional user input provided by the individual.

10. The method of claim 1, wherein the seat includes a frame having a primary structure configured to support the seat cushion and a secondary structure configured to support the leg support member, and wherein moving the leg support member includes sliding the secondary structure relative to the primary structure.

11. The method of claim 1, wherein the leg support member is configured to pivot relative to an end of the seat cushion to support the at least one of thighs and calves of the legs in one or more positions between a lowermost pivoting position and an uppermost pivoting position.

12. The system of claim 4, wherein the seat includes a frame having a primary structure configured to support the seat cushion and a secondary structure configured to support the leg support member, and the secondary structure is configured to slide relative to the primary structure.

13. The system of claim 4, wherein the leg support member is configured to pivot relative to an end of the seat cushion to support the at least one of thighs and calves of the legs in one or more positions between a lowermost pivoting position and an uppermost pivoting position.

14. The vehicle of claim 7, wherein the seat includes a frame having a primary structure configured to support the seat cushion and a secondary structure configured to support the leg support member, and the secondary structure is configured to slide relative to the primary structure.

15. The vehicle of claim 7, wherein the leg support member is configured to pivot relative to an end of the seat cushion to support the at least one of thighs and calves of the legs in one or more positions between a lowermost pivoting position and an uppermost pivoting position.

\* \* \* \* \*